DETAILED BLOCK DIAGRAM OF VARIABLE PRF
DISCRIMINATOR AND CIRCUIT WAVEFORMS

United States Patent Office 3,267,466
Patented August 16, 1966

3,267,466
RADAR INTERFERENCE REJECTION
James L. Poterack, El Paso, Tex., and Joseph P. Mefford, Bellerose, and Edward A. Stroud III, New Rochelle, N.Y., assignors, by mesne assignments, to the United States of America as represented by the Secretary of the Navy
Filed Oct. 13, 1964, Ser. No. 404,203
8 Claims. (Cl. 343—7.3)

This invention relates generally to the rejection of radar interference and more particularly to a system whereby interference caused by signals from another radar system or systems can be rejected.

Because radar systems are usually designed to accomplish a specific purpose it frequently occurs that a number of such systems will be operated at the same time in close proximity to one another.

Such a situation often occurs where radar search, radar track and radar guidance systems are operated close to one another on surface vessels, and may also occur in other environments where adjacent friendly radar systems are following a multiplicity of potential targets. When adjacent radar systems are operated simultaneously under such conditions certain relative antenna orientations can occur which will result in high receiver input power levels, depending upon the frequency separation of the radars. This situation becomes especially severe with high and multiple repetition rate radar systems but the degree of interference is dependent upon several of the electromagnetic parameters of the individual radar systems. The type of interference present at any one time will, for instance, depend on power level, pulse repetition frequency, and frequency of the unwanted signal at the offended antenna.

A number of adverse results can take place as the result of such unwanted reception by one radar receiver of energy transmitted by other radar systems. For example, there may be firing of the duplexer tube because of the received high level of energy, thus resulting in a rather severe loss of receiver time due to the tube firing. If the tube does not fire there will probably be an increase in the background noise in the indicator scopes caused by low level interference pulses running through receiver displays which can also produce data degradation as used in subsequent utilization systems as computers. Further, if the duplexer tube is not fired receiver saturation may occur and perhaps to the extent that the mixer crystals may burn out and require replacement.

One solution to this problem has been the provision of a synchronizing pulse generator having an output frequency equivalent to the pulse repetition frequency of one of the controlled radars. Frequency multipliers or dividers have been used also to provide additional synchronizing frequencies which are the equivalent of the respective pulse repetition frequencies of the other radars to be controlled. One of the drawbacks of such a system, however, is that each of the radars in the combined system must have a pulse repetition frequency that is a whole number multiple of the output frequency of the synchronizing generator. In addition to this, failure or inoperativeness of the synchronizing generator causes all the radars in the system to once again become equally susceptible to mutual interference.

A somewhat similar solution involved the use of a synchronizing generator to control the pulse repetition frequency of a first radar. Timing pulses were derived from this first radar to serve as synchronizing pulses for a second radar from which in turn were taken timing or synchronizing pulses for determining the operation of a third and additional radars. This system also suffers from the defects of dependence upon a single synchronizing generator and upon the fact that pulse repetition frequencies of all radar systems other than the first one are dependent upon the pulse repetition frequency of this first one.

Accordingly, it is an object of this invention to provide a radar system that is less susceptible to external interference.

It is another object of this invention to provide a radar system having reduced susceptibility to interference from other radar systems.

A further object of the invention is the provision of a radar receiver in which the output is completely shut off in the absence of a desired target signal.

Still another object of this invention is the provision of a radar receiver capable of distinguishing between true target returns and false returns caused by interference or noise pulses.

Another object of this invention is the provision of a radar receiver wherein a plurality of target returns of approximately the same range must be received to enable the receiver to lock on to this target.

The above objects are carried out by the invention which operates to lock on a target once at least two target responses are received at the same range, the circuit producing a video gate in which the desired target return appears, the rest of the sweep time not being displayed.

Other objects and features of the invention will become obvious to those skilled in the art as the disclosure is made in the following description of a preferred embodiment of the invention as illustrated in the accompanying sheets of drawings in which.

Figure 1:
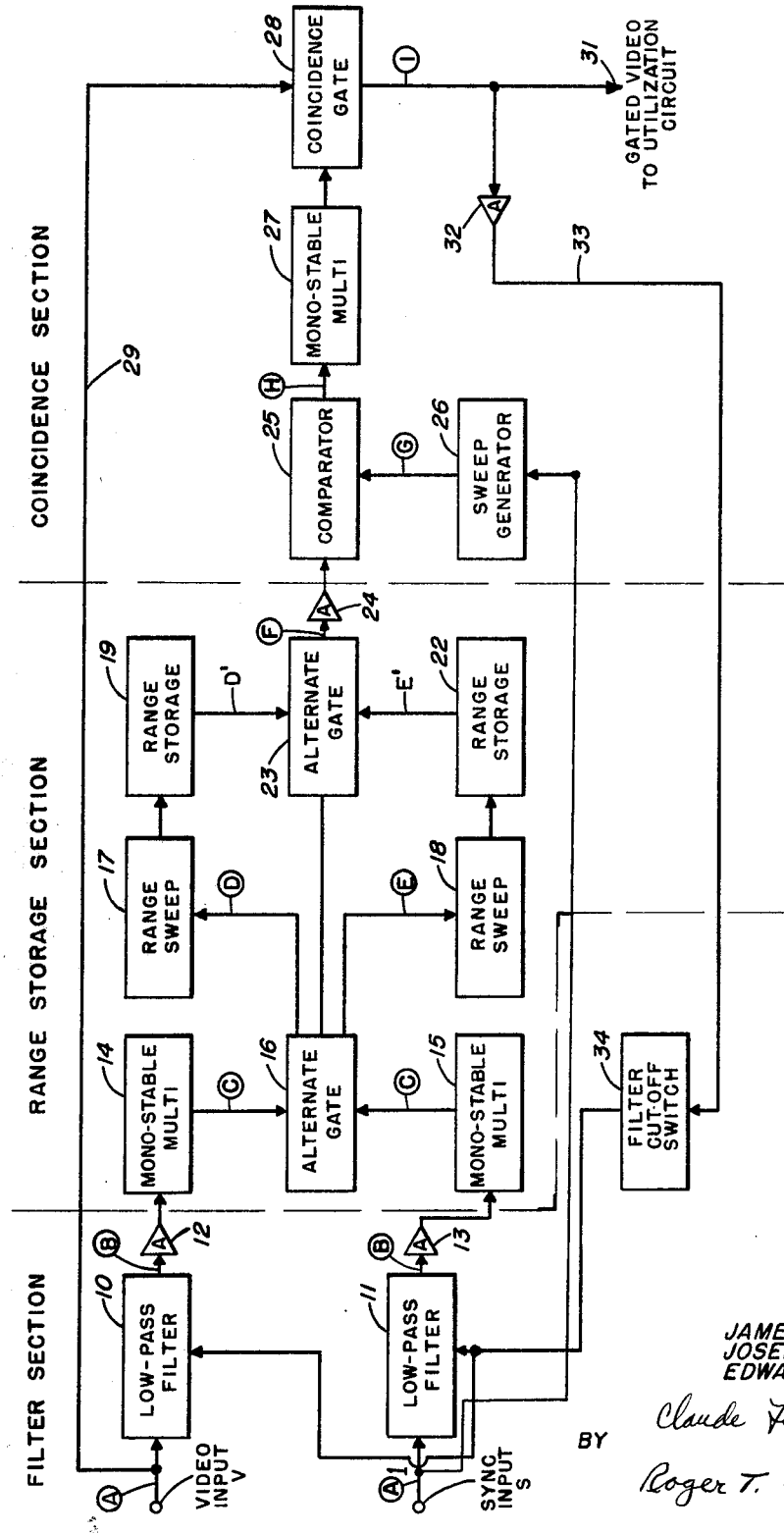
FIG. 1 shows a portion of a radar receiver embodying this invention.
Figure 2:
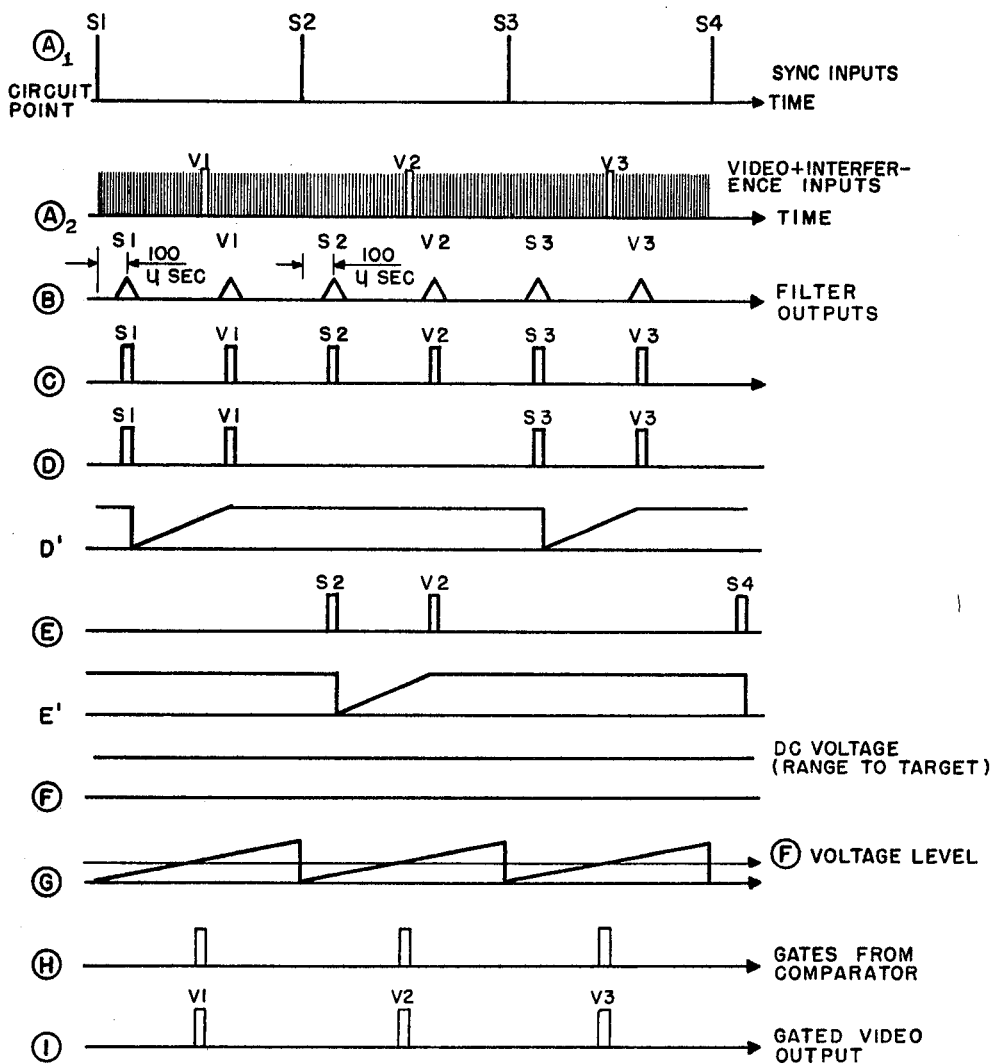
FIG. 2 shows representative wave forms that occur at various places in the circuit of FIG. 1.

More particularly, as shown in FIG. 1, the apparatus of this invention may conveniently be divided into three sections: a filter section, a range storage section and a coincidence section. As will be more particularly described below and as is shown by wave forms $A_1$ and $A_2$ on FIG. 2, the signal inputs to the apparatus consist of synchronizing pulses, video return pulses, and assorted interference input pulses. The output signal of the apparatus is a gated input signal which is passed on to other portions of the radar system, such as scope displays or various computers.

The frequency spectrum of a video pulse depends upon two parameters, the pulse width and the pulse repetition rate. The frequency spectrum lines are frequency-spaced at intervals equal to the pulse repetition rate. Each of low pass filters 10 and 11 has a cut-off frequency just below the lowest frequency interference spectrum line (10 kc., for instance). Thus, substantially all interference frequencies are excluded while desired frequencies up to approximately 10 kc., for instance, are passed. The output of each of the filters is a combination of the several frequencies below 10 kc. occurring in the desired pulse spectrum. As may be seen from FIG. 2, this output is delayed due to filter action from the main pulse input to the filter by approximately 100 microseconds. For convenience, low pass filter 10 may be referred to as a video input filter and low pass filter 11 may be referred to as a synchronizing input filter. The output of filters 10 and 11 are respectively passed to the amplifiers 12 and 13 where the outputs are amplified to a level sufficient for triggering the following monostable multivibrators 14 and 15. This output is first differentiated and the pulse leading edge is used as a trigger.

Proceeding to the range storing section, it may be seen that the output signals from each of the low pass filters 10 and 11 are received respectively by monostable multivibrators 14 and 15. The output of these multivibrators is off until a trigger signal is received from the respective filter. The multivibrators then conduct for the duration of the trigger signal after which the output will again be off until the next trigger signal is received. These trigger signals are exemplified by wave form B of FIG. 2 wherein S1 represents a trigger pulse formed from a first synchronizing signal originating in the synchronizing section of the radar system and V1 represents a target return signal from the signal transmitted by synchronizing pulse S1. S2 shows the next sync pulse which is responsible for the transmitted signal resulting in target return V2. S3 and V3 are similarly related. Since the input to each of multivibrators 14 and 15 is identical the outputs of these multivibrators as shown in wave form C2, FIG. 2, will also be identical.

The outputs of multivibrators 14 and 15 each pass to alternate gate 16 which acts in the nature of a flip-flop and serves alternatively to pass a sync pulse and its associated video pulse, e.g., S1 and V1, to range sweep generator 17 and then to pass the next sync pulse and its corresponding video pulse, e.g., S2 and V2, from multivibrators 14 and 15 to range sweep generator 18. Thus, as seen in wave forms D and E of FIG. 2, each range sweep generator receives every other sync pulse and its corresponding target return pulse, if any.

Upon receiving a sync signal pulse such as S1, range sweep generator 17 will commence generating a linearly increasing voltage with respect to time. The length of time the sweep generator 17 operates will be determined by the reception of a target return video pulse such as V1. In other words, upon receipt of sync signal S1 the range sweep generator 17 output starts to rise from zero to a voltage proportional to the range of the next target return pulse V1. The other range sweep generator 18 will similarly be started and stopped by sync signal S2 and target return signal V2.

The voltages produced in range sweep generators 17 and 18 will be received by and stored in storage units 19 and 22 which are in effect two storage capacitors. Each storage unit will retain the maximum voltage generated by its associated sweep generator until the next sync pulse is received by the sweep generator at which time any voltage stored will be discharged and the storage unit made ready to receive and store a new voltage.

The voltage levels which are representative of the range of the targets producing the video return pulses are contained in storage units 19 and 22 through two sweeps until they are fed to another alternate gate 23, the position of gate 23 being determined by the state of first alternate gate 16. The stored range voltages are alternately gated to the next section, so that a continuously changing range voltage is thus formed. Thus, while one of the range storage units 19 or 22 is receiving a charge voltage, the voltage stored in the other of these units is being passed through gate 23, amplified in amplifier 24, and passed on to the coincidence section.

The coincidence section consists of a voltage comparator 25, a sweep generator 26, and a monostable multivibrator 27, operation of which is triggered by the output of comparator 25, and a coincidence gate 28. Upon coincident reception of a signal from monostable multivibrator 27 and a video pulse signal from the video input through line 29 coincidence gate 28 will open and permit the passage of the video input signal. Thus, there will appear at output 31 gated video signals which may be passed on to appropriate utilization circuitry.

Comparator 25 functions to compare the level of voltage contained in either of range storage units 19 or 22 with the constantly and linearly varying sweep voltage produced by sweep generator 26. The operation of this sweep generator 26 is in turn controlled by the radar system sync pulses S1, S2, etc. When the voltage output of sweep generator 26 reaches that contained in one of the range storage units 19 or 22, comparator 25 produces an output voltage. This output voltage triggers monostable multivibrator 27 which in turn gates on the coincidence gate for a period of, for example, 6 microseconds, allowing a video output from the coincidence gate during that period.

A portion of the gated video output from coincidence gate 28 will be fed back through amplifier 32 and conductor 33 to a filter cutoff switch 34. Upon receipt of a signal, cutoff switch 34 serves to render both low pass filters 10 and 11 nonconductive for a predetermined period of time.

The operation of the invention will now be described. Assuming that the low pass filters 10 and 11 have not been cut off by switch 34, an input signal consisting of video pulses V representative of radar target return signals and various undesired interference inputs will be presented to low pass filter 10 while the sync pulses S are presented to low pass filter 11. The inputs to the filters 10 and 11 are represented by waveforms $A_1$ and $A_2$, FIG. 2. The outputs of the filters as shown in waveform B will consist essentially of only sync and video pulses delayed in time with respect to the input pulses.

The signal outputs of the filters will be amplified and shaped as described above and will be used to trigger respectively monostable multivibrators 14 and 15. The outputs of each of these multivibrators, shown by waveform C, is directed to alternate gate 16, which has two states of operation. In the first state it permits passage of signals from multivibrators 14 and 15 to range sweep generator 17 and at the same time blocks passage of signals to range sweep generator 18. In its other state alternate gate 16 permits passage of signals from multivibrators 14 and 15 to range sweep generator 18 and concurrently blocks passage of signals to range sweep generator 17. Thus, it may be seen that at any given time only one of sweep generators 17 or 18 is permitted to receive signals from the monostable multivibrators. Alternate gate 16 changes state each time a sync pulse is received from the monostable multivibrators.

A sync pulse applied to, for example, range sweep generator 17, through alternate gate 16, in turn causes discharge of any voltage stored in associated range storage 19 and also immediately causes range sweep generator 17 to commence operation. The voltage generated by generator 17 and stored in storage unit 19 will continue to increase linearly with time until a video pulse, for example, V1 is received by sweep generator 17. At this time generator 17 ceases operation and storage unit 19 retains the voltage stored therein. It will be seen that the level of this stored voltage is determined by the time required for a transmitted pulse to arrive at and return from a target and thus by the distance from the radar system of the target causing said return pulse. The next sync pulse will cause gate 16 to change state and will thereby cause range sweep generator 18 and range storage unit 22 to function in a similar manner.

During the time that one of the range storage units is receiving a charge voltage any voltage stored previously in the other range storage unit will be passed through second alternate gate 23 and amplifier 24 to the coincidence section. The voltage that is passed on to the coincidence section is a D.C. voltage representative of the range from the radar system to the target and is exemplified by waveform F.

The D.C. range voltage received by comparator 25 is compared with the linearly varying voltage produced by sweep generator 26. Operation of this sweep generator is triggered by the undelayed sync pulse S1, S2, etc., generated by the radar system synchronizing section. As will be seen in waveforms G and H, when the voltage output of the sweep generator reaches the D.C. range voltage, comparator 25 will produce an output pulse which will be fed to monostable multivibrator 27 and which in turn will cause this multivibrator to enable the coincidence gate to be gated on an input video pulse if a signal is also present at the coincidence gate 28.

The gate output from coincidence gate 28 will be amplified and fed back to filter cut-off switch 34 causing the filters 10 and 11 to become nonconductive for a predetermined period of time. This period of time is at least equal to the sync period of the radar system but is preferably not more than two of such sync periods. Since the low pass filters 10 and 11 will be cut off no pulses will be received by multivibrators 14 and 15 and, therefore, none will be received by range sweep generators 17 and 18. The voltage stored in range storage units 19 and 22 will not be discharged and the operation of comparator 25 will be as described before. If the next target return pulse is at substantially the same range as the D.C. range voltage contained in the range storage unit, this target pulse will be gated through coincidence gate 28. This next opening of gate 28 by a pulse from multivibrator 27 will again cause filter cutoff switch 34 to cut off, or to keep cutoff low-pass filters 10 and 11 for another predetermined period of time. However, if no target return signal is received at the proper time for range gating, or if none is received at any time within the next sync period, then coincidence gate 18 will have no output and thus low pass filters 10 and 11 will be permitted to become operative again. This will permit a new target range voltage to be set into the range storage section.

In the illustration above, if no target return signal had initially been received, then the voltage stored in range storage unit 19 or 22 would be the maximum voltage to be produced by sweep generator 26. Multivibrator 27 would furnish a pulse to coincidence gate 28 only at the end of the sweep period. However, because of the absence of the video target return signal this gate would not open and would produce no output voltage; thus, filters 10 and 11 would not be cut off and the range storage section would remain susceptible to receipt of a future target return signal.

From the foregoing description of the circuit and its operation it may be seen that the circuit remains locked on a target independently of the filters as long as the target return appears during a video gate period. Though it is possible for a target return to be missed if the circuit is triggered by an interference pulse or a noise spike, a target pulse will not be passed unless two consecutive interference or noise pulses trigger the circuit at the same range. The percentage of false target signals produced for an input signal-to-interference ratio of −3 db with little or no receiver noise is 1.0 percent. For a signal-to-receiver noise ratio of +3 db the pulse target percentage is 4.0 percent. For a combination of the above ratios, false targets would be produced approximately 5.0 percent of the time.

The limitation of this circuit is the requirement that the two initial target returns have a signal-to-interference ratio of −3 db and a signal-to-receiver noise ratio of +3 db or better. This is not a severe limitation because the circuits acts independently of the filter section after it has locked onto a target return. After it has locked on, the ratios can be lower than the above with no loss of the target return since at that time the low pass filters will not be contained in the circuit and the video output will be effectively bypassed around the circuit through coincidence gate 28.

The invention as described provides a radar receiver circuit which will have no output in the absence of a radar target return, even in the presence of various strong interfering signals. Because of this and because of a relatively low probability that noise pulses will be mistaken for pulse target signals the radar operator or the signal utilization circuit will be subjected to interference for a greatly reduced period of the radar operating time. A radar system having a relatively low pulse repetition rate, such as a monopulse radar, can thus be more effectively operated in the presence of a potentially interfering radar system having a high pulse repetition rate.

It should be understood, of course, that the foregoing disclosure relates to only a preferred embodiment of the invention and that numerous modifications or alterations may be made therein without departing from the spirit and the scope of the invention as set forth in the appended claims:

What is claimed is:

1. In a radar receiver of the type receiving a first input signal consisting of synchronizing pulses and a second input signal consisting of target return pulses and unwanted intereference signals, interference rejection apparatus comprising:

filter means for receiving the input signals, the outputs of said filter means consisting essentially of sync pulses and target return pulses;

range storage means receiving the outputs of said filter means and generating range voltages whose magnitudes are a function of the time separation between a sync pulse and its associated target return pulse;

voltage comparison means for comparing the magnitude of said range voltages with the range sweep voltage of the radar receiver, said voltage comparison means producing an output pulse at the time when the range sweep voltage equals said range voltage;

coincidence gate means controlling the passage of the second input signal to other sections of the radar receiver, said coincidence gate controlled by the output of the voltage comparison means, passage of the second input signal through the coincidence gate being permitted only upon the simultaneous occurrence of the second input signal and an output pulse from the voltage comparison means;

means responsive to the output of said coincidence gate rendering said filter means non-conductive for a predetermined period of time after said coincidence gate passes an input signal.

2. Apparatus as in claim 1 wherein said filter means comprise low-pass filters having a cut-off frequency just below the lowest expected interference frequency.

3. Apparatus as in claim 1 further comprising a monostable gate generator connected to receive the output pulses of said voltage comparison means, said gate generator having no output until triggered by one of said comparison means output pulses and producing an output pulse of fixed duration when so triggered, the output pulses of said monostable gate generator being supplied to said coincidence gate means to enable the input signal to be passed therethrough.

4. Apparatus as in claim 1 wherein the period of time during which said filter means is rendered nonconductive is at least one sync period in duration.

5. In a radar receiver of the type adapted to receive input signals consisting of synchronizing pulses, target return pulses and unwanted interference signals, interference rejection apparatus comprising:

first filter means to receive the target return pulses and unwanted intereference signals;

a second filter means to receive the synchronizing pulses;

a first pulse generating means connected to receive the output of said first filter means;

a second pulse generating means connected to receive the output of said second filter means, each of said pulse generating means functioning to produce an output pulse when triggered by an output from its respective filter means;

alternate gate means receiving the output of both of said pulse generating means, said alternate gate functioning to permit alternate passage therethrough of first one and then the other of said output pulses;

first range voltage generating means receiving the first gated output of said first and said second pulse generating means;

second range voltage generating means receiving the second gated output of said first and said second pulse generating means, each of said range voltage generating means receiving alternate pairs of pulses from the first and second pulse generating means and functioning when supplied with a first gated input pulse representative of a sync pulse to commence generating a linearly increasing output voltage and to cease generating said voltage when supplied with a second gated input pulse representative of a target return pulse;

first range storage means connected to reecive and store the output voltage of said first range voltage generating means;

second range storage means connected to receive and store the output voltage of said second range voltage generating means, each of said range storage means being capable of having any voltage stored therein discharged upon receipt by its associated range voltage generating means of a gated pulse representative of a sync pulse, whereby the range storage means is placed in condition to store the next output voltage;

second alternate gate means having an input connected to each of said range storage means, and an output, said alternate gate serving alternatively to select and pass on to its output the voltage stored in the one of the range storage means whose charge period was not initiated by the last preceding sync pulse;

voltage comparator means having two inputs, one of said inputs being connected to the output of said second alternate gate means and the other of said inputs being connected to receive a voltage which is swept from zero to a maximum value each sync period, said voltage comparator producing an output pulse when the level of the swept input voltage reaches the level of the voltage delivered by the second alternate gate from one of the range storage units;

coincidence gate means controlling the passage of the target return pulses and the unwanted interference signals to utilization sections of the radar receiver, said coincidence gate means being responsive to the output pulses of said voltage comparator means to permit passage of the target return pulses and the unwanted interference signals only upon simultaneous occurrence of said output pulse and target return pulses and the unwanted interference signals; and means responsive to the output of said coincidence gate for rendering both of said first and second filter means nonconductive for a predetermined period of time after said coincidence gate passes an input signal.

6. Apparatus as described in claim 5 wherein each of said filter means comprises a low-pass filter having a cut-off frequency just below the lowest expected interference frequency.

7. Apparatus as described in claim 5 further comprising a monostable gate generator means connected to receive the output pulses of said voltage comparator means, said monostable gate generator means having no output until triggered by an output pulse of said voltage comparator means and producing an output pulse of fixed duration when so triggered, the output pulse of said monostable gate generator means being supplied to said coincidence gate means to permit passage of the input signal therethrough.

8. Apparatus as in claim 5 wherein said period of time during which said first and second filter means are rendered nonconductive is at least one sync period in duration.

No references cited.

CHESTER L. JUSTUS, *Primary Examiner.*

T. H. TUBBESING, *Assistant Examiner.*